US010821384B2

United States Patent
Reuben

(10) Patent No.: US 10,821,384 B2
(45) Date of Patent: Nov. 3, 2020

(54) DOWN FEATHER FILTER MEDIUM

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 407 days.

(21) Appl. No.: 15/731,936

(22) Filed: Aug. 28, 2017

(65) Prior Publication Data

US 2019/0060811 A1 Feb. 28, 2019

(51) Int. Cl.
| | | |
|---|---|---|
| *B01D 39/16* | (2006.01) | |
| *B01D 39/08* | (2006.01) | |
| *A62B 23/00* | (2006.01) | |
| *B01D 39/20* | (2006.01) | |
| *B29K 67/00* | (2006.01) | |

(Continued)

(52) U.S. Cl.
CPC .......... *B01D 39/163* (2013.01); *A62B 23/00* (2013.01); *B01D 39/083* (2013.01); *B01D 39/1615* (2013.01); *B01D 39/1623* (2013.01); *B01D 39/2017* (2013.01); *B29C 43/228* (2013.01); *B29C 43/265* (2013.01); *B29C 43/305* (2013.01); *A62B 18/025* (2013.01); *A62B 23/025* (2013.01); *B01D 2239/0442* (2013.01); *B01D 2239/0457* (2013.01); *B01D 2239/086* (2013.01); *B29K 2067/00* (2013.01); *B29L 2031/14* (2013.01)

(58) Field of Classification Search
CPC ........ B01D 39/08; B01D 39/00; B01D 39/02; B01D 39/04

See application file for complete search history.

(56) References Cited

U.S. PATENT DOCUMENTS 5,705,030 A * 1/1998 Gassner, III ............. D01B 3/00
162/2
5,800,586 A * 9/1998 Cusick ................. B01D 39/202
210/491

(Continued)

FOREIGN PATENT DOCUMENTS

| CA | 2279174 | * 10/2003 |
|---|---|---|
| CN | 101385921 | * 3/2009 |

(Continued)

OTHER PUBLICATIONS

English translation of CN 101385921 Mar. 2009 (Year: 2009).*
English translation of CN 101787619-A description from Espacenet (Year: 2010).*

*Primary Examiner* — Christopher P Jones
*Assistant Examiner* — Brit E. Anbacht
(74) *Attorney, Agent, or Firm* — Guy J. Houle; Houle Patent Agency Inc.

(57) ABSTRACT

An air/gas filter medium is comprised of a substantially homogeneous core layer of feather down clusters held together by a binder to form a 3-dimensional interconnected filament structure throughout the core. The filament structure forms air pocket and connect and trap the feather down clusters which form minute air pockets between its filaments and hairs in which undesirable substances from an air/gas flow therethrough are captured. An air permeable scrim sheet is retained on a surface of the down cluster core. The down cluster core is compressed to a predetermined density to modify the average size of said minute air pockets to trap known undesirable substances from the air/gas flow.

16 Claims, 3 Drawing Sheets

(51) Int. Cl.
*B29C 43/22* (2006.01)
*B29C 43/30* (2006.01)
*B29C 43/26* (2006.01)
A62B 18/02 (2006.01)
B29L 31/14 (2006.01)
A62B 23/02 (2006.01)

(56) References Cited

U.S. PATENT DOCUMENTS

| | | | | |
|---|---|---|---|---|
| 5,806,154 | A * | 9/1998 | Tolbert | A41D 31/02 28/103 |
| 6,027,608 | A * | 2/2000 | Gassner | D01C 3/00 162/1 |
| 2006/0096932 | A1* | 5/2006 | Dema | B01D 27/06 210/767 |
| 2009/0056548 | A1* | 3/2009 | Woo | B03C 3/30 95/287 |
| 2009/0155543 | A1* | 6/2009 | Fowler | B32B 5/26 428/179 |
| 2010/0186595 | A1* | 7/2010 | Huang | B01D 39/12 96/226 |
| 2011/0030557 | A1* | 2/2011 | Brownstein | D04H 1/46 95/273 |
| 2011/0192799 | A1* | 8/2011 | Brelsford | B01J 20/28033 210/660 |
| 2011/0214570 | A1* | 9/2011 | Jones | B01D 39/1623 95/287 |
| 2011/0259813 | A1* | 10/2011 | Wertz | B01D 39/163 210/491 |
| 2013/0197664 | A1* | 8/2013 | Ballard | D04H 1/728 623/23.72 |
| 2013/0327218 | A1* | 12/2013 | Izzi | B01D 46/0082 95/281 |
| 2013/0340613 | A1* | 12/2013 | Krupnikov | B01D 53/0407 95/90 |
| 2014/0083066 | A1* | 3/2014 | Bahukudumbi | B01D 46/0001 55/527 |
| 2014/0130469 | A1* | 5/2014 | Nagy | B01D 39/18 55/487 |
| 2016/0040337 | A1* | 2/2016 | Dutkiewicz | D04H 1/559 428/172 |

FOREIGN PATENT DOCUMENTS

| | | | | |
|---|---|---|---|---|
| CN | 101 787 619 A | | 7/2010 | |
| CN | 101787619 A | * | 7/2010 | |
| EP | 2774499 A1 | * | 9/2014 | B32B 5/26 |
| EP | 2 774 499 | | 10/2014 | |

* cited by examiner

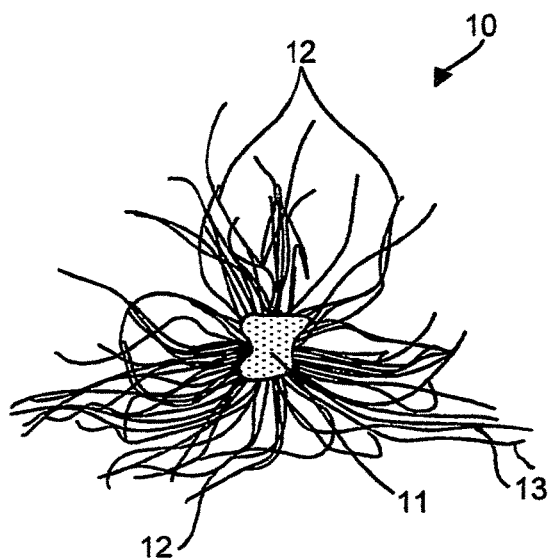
FIG. 1
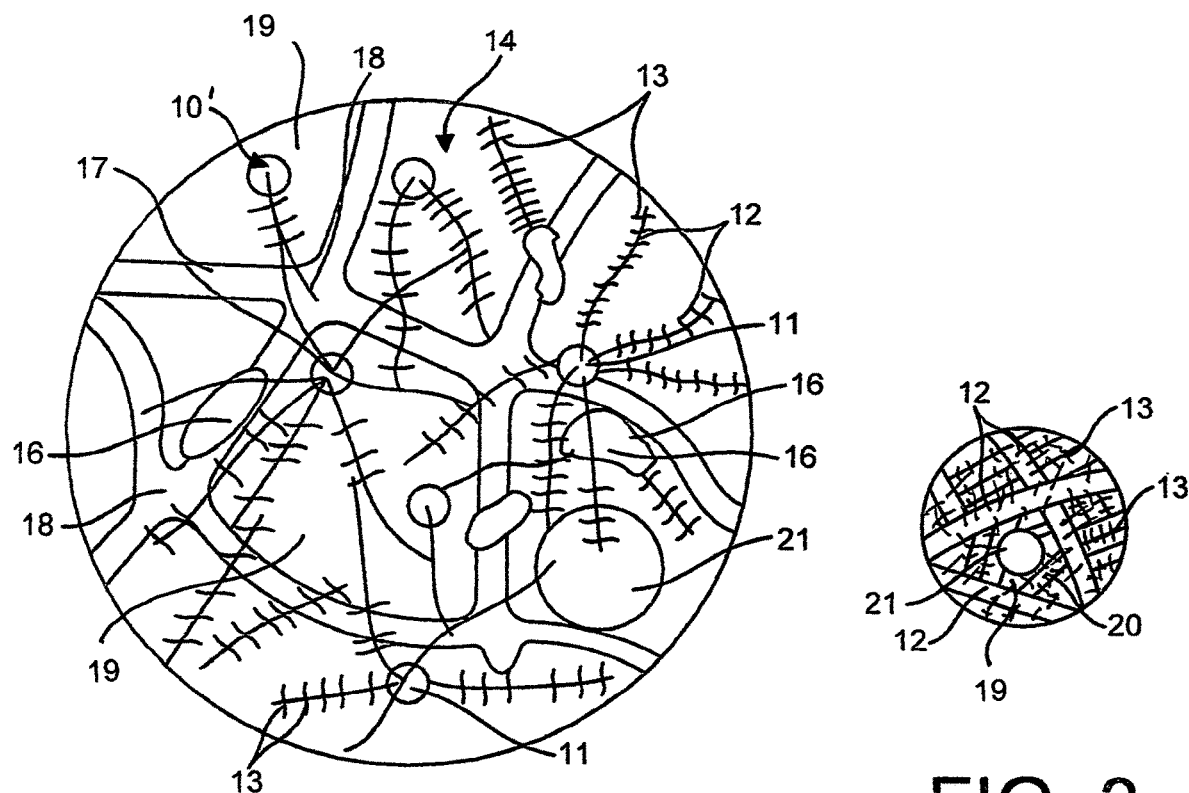
FIG. 2
FIG. 3

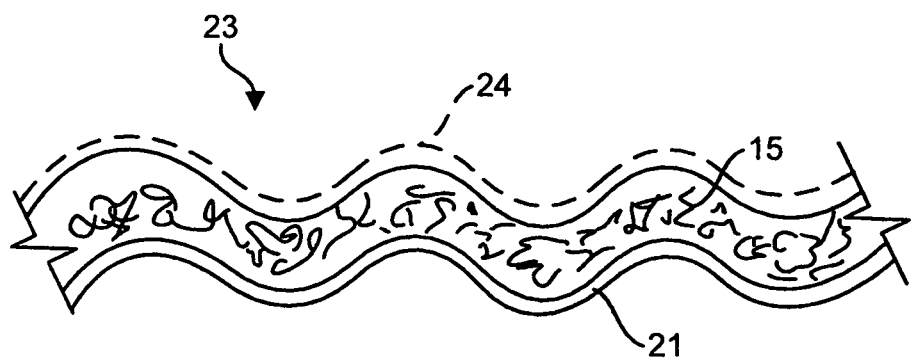
FIG. 4
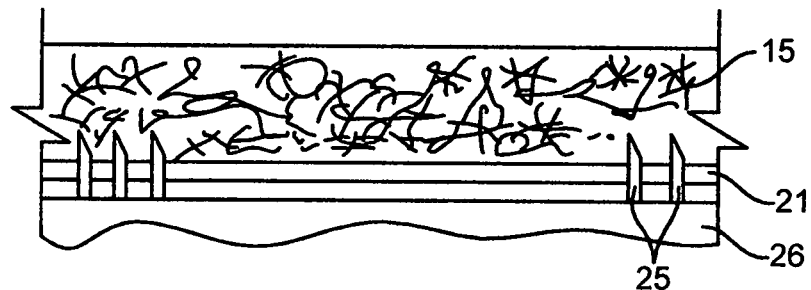
FIG. 5
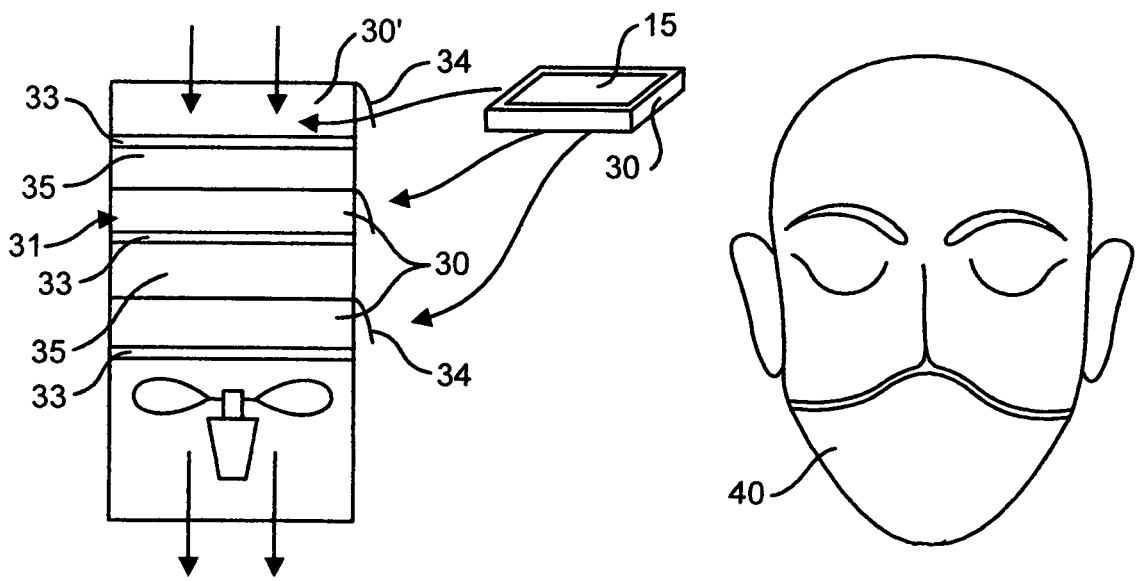
FIG. 6
FIG. 7

DOWN FEATHER FILTER MEDIUM

FIELD OF THE INVENTION

The present invention relates to an air/gas filter medium having a substantially homogeneous core layer of feather down clusters held together by a 3-dimensional interconnected filament structure to interconnect or trap the feather down clusters and to form air pockets of various dimensions to trap undesirable substances from an air/gas flow passing through the filter medium.

BACKGROUND OF THE INVENTION

Filtration of an air or gas streams to remove undesirable substances has long been a practice in a variety of industrial and consumer fields. Know means for the filtration of particulates from an air or gas stream include filter plates, filter bags and cartridges and all sorts of other forms of filter structures. Known filtration techniques utilize the filter media to capture particles through the structure of the filter matter. As particles accumulate in the filter matter the filtration efficiency increases. However, the build-up of particulate material affects the efficiency of the filter and the flow rate of the air or gas through the filter matter reducing its efficiency to a level where the filter needs to be discarded and replaced, if it is of the non-cleanable type.

Typical filter elements are constructed from felt materials made from a variety of materials, such as polyesters, polypropylenes, aramids and fluoropolymers and the like suitable materials. These materials are selected based on their intended use to filter undesirable particulates from an air or gas stream.

In my U.S. Pat. No. 6,025,041 there is disclosed the construction of a down feather sheet wherein the down is mixed with a binder, such as glue particles or binding synthetic fibers or a mixture thereof, to form a substantially homogeneous sheet for use as a thermal insulator. Down which is a natural fiber is known to have excellent thermal insulating properties due to the fact that it is formed of clusters having a plurality of fibers radiating from a cluster core with the fibers having a multitude of minuscule hairs to trap air which is an excellent insulator. My down feather sheet was developed for preventing the feather down from shifting and clumping when used in the construction of articles of apparel where the down is inserted loosely between fabric sheets.

From my study of down clusters and the fact that I have been successful in harnessing the down in a homogeneous structure, I have come to realize that by trapping the clusters in a 3-dimensional interconnected filament structure, a multitude of air pockets are formed by the binder and the filaments of the down to trap the clusters. Various sizes, down to miniscule air pockets are formed between the cluster filaments and their multitude of hairs and the spaces between the filament structure. This created the best known thermal insulator but I also discovered that it could be used as an excellent air/gas filter to trap impurities therefrom seeing the material is permeable to an air/gas flow. However, it needs to be adapted for such use.

SUMMARY OF THE INVENTION

It is therefore feature of the present invention to provide an air/gas filter medium comprised of a substantially homogeneous core layer formed of feather down clusters held captive in a 3-dimensional interconnected filament structure of predetermined density suitable to filter known undesirable substances from an air/gas flow.

Another feature of the present invention is to provide an air/gas filter medium comprised of a substantially homogeneous core layer formed of feather down clusters to which an air permeable scrim sheet is attached and wherein the core layer and/or scrim sheet is treated with a chemical or solution to filter impurities and/or resist to humidity in a known air/gas medium to be filtered.

Another feature of the present invention is to provide an air/gas filter medium comprised of a substantially homogeneous core layer formed of feather down clusters and which is subjected to a predetermined compression to modify the density of the filament structure in which are retained the down clusters to trap known undesirable particle sizes in the miniscule air pockets formed by the down clusters and the filament structure.

Another feature of the present invention is to provide an air/gas filter medium comprised of a substantially homogeneous core layer formed of feather down clusters held captive in a 3-dimensional interconnected filament structure and wherein the core layer has two or more air permeable layers of different densities adapted to trap undesirable particles of different sizes in respective ones of the layers.

Another feature of the present invention is to provide an air/gas filter medium comprised of a substantially homogeneous core layer formed of feather down clusters held captive in a 3-dimensional interconnected filament structure and wherein the down clusters may be formed of different types of down feather clusters to modify the internal air/gas permeability of the core layer.

Another feature of the present invention is to provide a method of forming an air/gas filter medium comprised of a substantially homogeneous core layer formed of feather down clusters held captive in a 3-dimensional interconnected filament structure and wherein the core layer has two or more air permeable layers of different densities.

According to the above features, from a broad aspect of the invention, there is provided an air/gas filter medium comprised of a substantially homogeneous core layer of feather down clusters held together by a binder mixed with the feather down clusters. The binder together with filaments of the down clusters forms a 3-dimensional interconnected filament structure throughout the core to connect and trap the clusters in the structure and to form minute pockets to trap undesirable substances. An air permeable scrim sheet is retained on at least a surface of the core layer. The core layer has a predetermined density obtained by control compression of the core layer for the application of the filter medium to filter known undesirable substances contained in an air/gas flow passing through the filter medium.

According to a further broad aspect of the present invention there is provided a method of forming an air/gas filter medium comprising the steps of:
i) mixing a predetermined quantity of feather down clusters with a binder and depositing the mixture on a conveyor surface under movement to form a first layer of the mixture,
ii) compressing the first layer of the mixture to a predetermined thickness,
iii) subjecting the compressed first layer to heat treatment to activate the binder,
iv) depositing a second predetermined quantity of feather down clusters mixed with a binder on a top surface of the first layer after heat treatment,
v) subjecting the second layer deposited on the first layer to further compression while simultaneously compressing the first layer to form a core layer having two horizontal layers of feather down clusters having different densities, vi) further heat treating the core layers having the two horizontal layers of feather down clusters to cause the binder of the second layer to set, and vii) cooling the core layers to form an air/gas filter medium core layer having at least two horizontal air permeable layers of different densities.

DESCRIPTION OF THE DRAWINGS

A preferred embodiment of the present invention will now be described with reference to the accompanying drawings in which:

FIG. 1 is a microscopic image of a feather down cluster from a goose illustrating its structure;

FIG. 2 is an enlarged view illustrating the 3-dimensional interconnected filament structure of the feather down cluster core of the air/gas filter medium of the present invention;

FIG. 3 is a microscopic view showing particulate filtered material held captive by the miniscule air pockets and hairs of cluster filaments;

FIG. 4 is a fragmented cross-section view showing an air/gas filter medium constructed in accordance with the present invention and wherein the scrim sheet as been shaped with a wave shape to increase the surface area of the filter medium over a predetermined area in which the filter medium is disposed;

FIG. 5 is a cross-section view illustrating the needle point technique of fabricating an air permeable scrim sheet;

FIG. 6 is a simplified schematic view of a filter housing defining a restricted passage in which an air/gas stream is directed to filter impurities therefrom;

FIG. 7 is a schematic illustration showing a further application of the air/gas filter medium as herein used in the construction of a face mask;

DESCRIPTION OF THE PREFERRED EMBODIMENT

Figure 8:
FIG. 8 is a fragmented cross-section view showing the construction of the filter medium as containing two core layers of feather down clusters compressed to different densities to create air pockets of different dimensions to trap particulate material of different sizes.

Referring to the drawings and more particularly to FIG. 1, there is show, generally at 10, a microscopic view of a feather down cluster. It consists of a cluster core 11 having a great number of filaments 12 attached to the core 11 and radiating in all directions about the core. Each filament 12 has a plurality of small hairs 13 radiating thereabout, as better seen from FIGS. 2 and 3. These down clusters are in contact with a bird's body under the thick outer feathers and they trap air molecules in small pockets to create a thermal insulating barrier. There are approximately 2 million of these filaments for every ounce of down that crisscross every which way. That is why down is known as the ultimate thermal insulating material. Geese and duck are the major sources of down insulation.

As described in my earlier patent referenced above, I have discovered that I can now use the property of the down clusters, in combination with my binding technique, to trap the clusters and use their air pockets not to provide thermal insulation but to use them as traps for unwanted particulate microscopic material contained in air or gases to filter them out of the air or gas when passed therethrough. Accordingly, as shown in FIGS. 2 and 3, an air/gas filter medium 14 can be formed by fabricating a substantially homogeneous core layer 15, see FIGS. 4 and 5, of feather down clusters 10 held together by a binder, herein glue particles 16 mixed with binding polyester fibers 17, which bind to one another and to the filaments 12 of the feather down clusters 10 to form a 3-dimensional interconnected filament structure. With my fabrication method we can also trap other substances, such as chemicals in powder or sprayed liquid form or microcapsules to alter the smell of air or gas to be filtered. The microcapsules can contain substances which are released when in contact with certain gases, for example, or when exposed to a predetermined temperature. A filter constructed as described herein may have several applications, such as in the medical field, hospitals, factories, household uses, etc.

FIG. 2 illustrates the 3-dimensional interconnected filament structure of the filter medium. As can be seen, the binding fibers 17, when heat treated, bind together at their crossings 18 and trap feather down clusters 10', a few only being shown herein, in the pockets 19 formed by the network of criss-crossing fibers 17. As well, if glue particles 16 are used in the mixture, they also adhere to the fibers 17 and the filaments 12. As shown in FIG. 3, the crisscross of the cluster filaments 12 with their tiny hairs 13 also form pockets in which microscopic particles 21 can be held captive.

To use such medium as a filtration medium it is important to know the intended use of the filter medium and the nature of the air or gas stream to be filtered whereby the pockets 19 and 20 are sized to be effective in removing the undesirable substance, be it particles, gases, organisms and pathogens. Accordingly, the size of the pockets are determined by compressing the loft of the core layer 15 before the binder is set to achieve a desired density or air permeability (cfm/ft square) of the material within the core. An air permeable scrim sheet 21 is also retained on a surface of the core 15 to provide added support of the filter medium 14 and to permit shaping of a sheet 23 of the medium by the use of a scrim material capable of being set to a predetermined shape by heat treatment in a die whereby to form a filter sheet having increase surface area per square inch of the core layer 15 while maintaining a constant thickness of the core layer, as shown in FIG. 4.

The air permeable scrim sheet 21 may be formed of woven or non-woven material having air passages therethrough. Also, as shown in phantom lines 24 in FIG. 4, a further scrim sheet can be attached on the opposed surface of the core layer by suitable binding means. These scrim sheets can be attached by glue or lamination on the core material before the binder sets thereby attaching the core to the scrim sheet. Further, the scrim sheet 21 can be secured to the core by needles 25 in a needle point attaching process, as is well known in the art, wherein a support 26 with a plurality of the needles 25 is caused to penetrate and retract form the scrim sheet positioned on a surface of the core layer 15. The scrim sheet material can be selected from the group consisting of polypropylene, polyethylene, polyurethane, nylon, fiberglass and other suitable scrim materials.

Another advantage of the air/gas filter medium of the present invention is that the core layer 15 and/or the scrim(s) 21, 24, can be treated with an activated carbon to destroy poisonous gas and microbes. It can also be treated with a water repellant solution for use in filtering a gas or air medium saturated with humidity. Still further, it can be treated with a disinfectant solution to form an antimicrobial barrier to kill bacteria and mould or fungus making the filter medium suitable for use it hospitals or clinics where such pathogens may be present. A fire-retardant solution may also be applied to the core layer or the scrim or both for use of the air filter medium in a hot environment where combustible gases are present in an air flow to be filtered.

As shown in FIG. 6 the filter medium of the invention can be dimensioned for insertion into a square support frame 30 for support in a filter housing 31 through which an stream of air or gas to be filtered is drawn into by an impeller fan 32. Several filter frames 30 can be supported spaced apart in the housing 31 whereby an air space 33 is created between the filter frames 30. Also, the stages formed by these filter frames may contain filter mediums of different densities wherein larger particles are trapped in the uppermost one 30' of the frames which is of less density than succeeding filter frames to progressively filter out particles to a predetermined smaller size. Thus, by having filter stages of different filter densities the filter frames have a longer life span for the reason that they do not get clogged quickly by letting certain particle sizes through while capturing others. Alternatively, the filters may be identical with most particles trapped in the upper filter frame which is changed more frequently. Suitable detecting means may be provided and mounted on the housing 31, such as in the spaces 35 between the frames to monitor air flow or quality to provide information to a monitor device of the quality of the air/gas and providing an indication when it becomes necessary to change the core layers 15 of the frames 30. Doors 34 provide access to the filter frames. Although the filter arrangement herein illustrates shows filter support frames of rectangular shape, the filter medium sheet can be cut in various shapes such as circular, etc, for use in different support housing, capsules or housings.

As shown in FIG. 7, the filter medium 14 of the present invention can be used in the construction of a face mask 40 and wherein the air permeable scrim sheet 21, 24 is made from a non-woven permeable material capable of air passage and obstruction to down cluster and filaments. The air permeable down material may also be mixed with substances and carriers such as the microcapsules mentioned herein above.

Figure 9A:
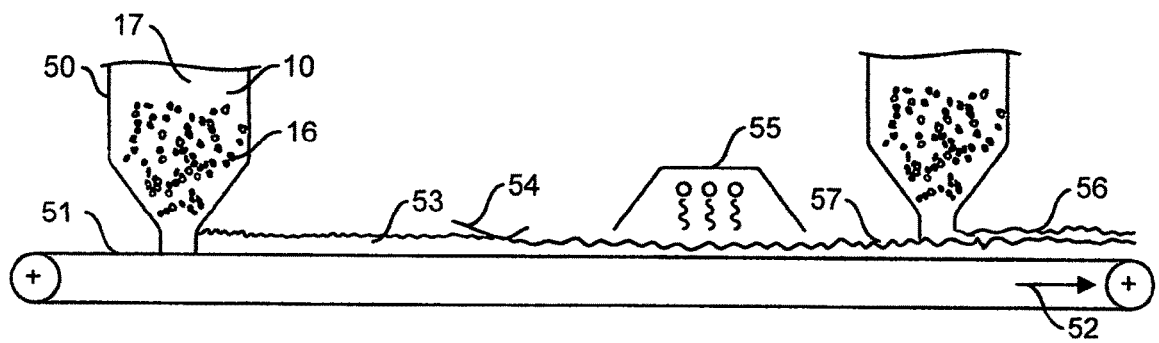
FIGS. 9A and 9B are schematic views illustrating the method of fabricating the filter medium of FIG. 8 with two core layers of different densities.
Figure 9B:
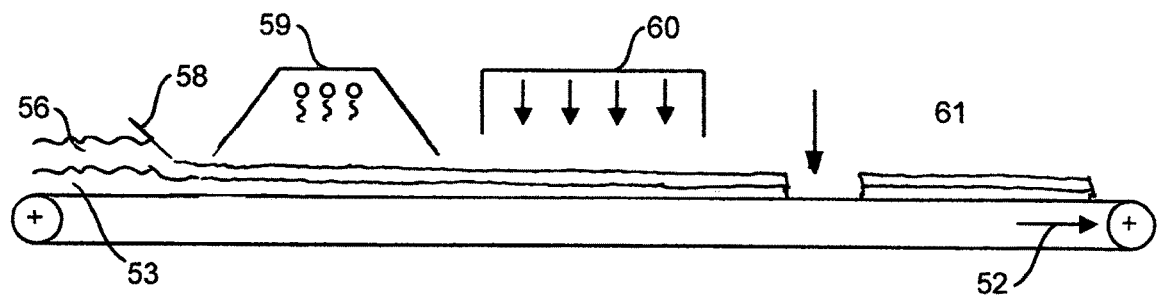

With reference now to FIGS. 8 to 9B, there is described the formation of the air/gas filter medium 10 of the present invention and wherein the core layer 15' is formed with two horizontal air permeable layers 45 and 46 with the lowermost layer 46 having its feather down clusters compressed to a higher density than the down clusters in the uppermost layer 45. Thus, a majority of larger particles size of the undesirable substances will be trapped in the uppermost layer which contains pockets of larger dimension and smaller particle size of the undesirable substances will be trapped in the lowermost one of the layers where the pockets are of smaller dimension. Accordingly, a filter medium constructed as such provides increase efficiency and longevity of the filter medium. Effectively, it is two filters embodied in a single filter medium resulting in a space and cost saving. The uppermost layer of the down clusters mixed with the binder is adhered to the lowermost layer by the adhesive state of the binder in the lowermost layer or by a heat activated glue that may be applied therebetween in its fabrication process. It is also pointed out that the uppermost layer 45 and the lowermost layer 46 may be formed of different feather down clusters selected from the group consisting of goose or duck down cluster, a mixture of goose or duck down cluster with tiny down feathers, and a mixture thereof with synthetic fibers in predetermined proportions to give different characteristics to the layers or to reduce cost as quality down is expensive.

In my U.S. Pat. No. 9,380,893, I disclose the construction of a stretchable down sheet wherein the binder and the scrim sheet is formed of materials which exhibit controllable multi-directional stretching. In certain application where the filter medium has to exhibit stretchability due to a pressurized air or gas flow to be filtered, such filter core construction would flex and resist to these forces.

With reference now to FIGS. 9A and 9B there will be briefly described the method of forming an air/gas filter medium with two or more air permeable layers, herein two layers 45 and 46, has illustrated in FIG. 8. The method comprises mixing a predetermined quantity of feather down clusters 10 and dry glue particles 16 and fibers 17 in a mixing chamber and depositing the mixture on a conveyor surface under movement in the direction of arrow 52 to form a first layer 53 of the mixture. The mixture is then compressed by a compressing wall plate 54 to a predetermined thickness. This compressed first layer 53 is then conveyed into a heat treatment chamber 55 to activate the binder(s). A second predetermined quantity of feather down clusters 56 mixed with a binder is deposited on a top surface 57 of the first layer after heat treatment. The second layer deposited on the first layer is subjected to further compression by a compression plate 56 while further compressing said first layer 53 to form a core layer having two horizontal layers of feather down clusters having different compressions. The core layer having the two horizontal layers of feather down clusters is further heat treated in a controlled heat chamber 59 to cause the binder of the second layer to set. The core with the two different air permeable layers is then conveyed through a cooling chamber to cool the binder to form an air/gas filter medium core having at least two horizontal air permeable layers of different densities. The formed core sheet can then be rolled or cut into sheets 61 as herein illustrated.

It is within the ambit of the present invention to cover any obvious modifications of the preferred embodiment disclosed herein provided such modifications fall within the ambit of the appended claims.

The invention claimed is:

1. An air/gas filter medium comprising a substantially homogeneous core layer of feather down clusters held together by a binder mixed with said feather down clusters, said down clusters each having a cluster core with a multitude of filaments attached to said cluster core and radiating in all directions with each filament having hairs, said binder being comprised of synthetic binding fibers or synthetic binding fibers and glue particles mixed with said feather down clusters and heat set wherein said synthetic binding fibers heat bind together at crossings where they touch and with filaments of said down clusters to form a 3-dimensional interconnected filament structure comprised of said synthetic binding fibers and filaments of said down clusters interconnected at their crossings throughout said core to connect and trap said down clusters in said structure, said down clusters and synthetic filaments also forming miniscule air pockets to trap and filter unwanted particles, gases, organisms and pathogens substances contained in air and gases; an air permeable scrim sheet retained on at least a surface of said core layer, said core layer being compressed to a predetermined density obtained by control compression of the loft of said core layer to compress said miniscule air pockets to a predetermined size to achieve a desired density or air permeability (cfm/ft square) of said core layer for the application of said air/gas filter medium to filter said substances contained in an air/gas flow passing through said air/gas filter medium.

2. The air/gas filter medium as claimed in claim 1 wherein said homogeneous core layer and/or said scrim sheet is further treated with one of activated carbon to destroy poisonous gas and microbes, a water repellant solution for use in filtering a gas medium saturated with humidity, a disinfectant solution to form an antimicrobial barrier to kill from bacteria and mould or fungus, and a fire retardant solution for use of said air/gas filter medium in an environment where combustible gases are present in an air/gas flow to be filtered.

3. The air/gas filter medium as claimed in claim 1 wherein said air permeable scrim sheet is formed of woven or non-woven material having air passages therethrough.

4. The air/gas filter medium as claimed in claim 1 wherein there is provided a further scrim sheet wherein said scrim sheets are secured on opposed surfaces of said core layer, both said scrim sheets being bonded to said core layer.

5. The air/gas filter medium as claimed in claim 1 wherein said scrim sheet is formed from a perforated material selected from the group consisting of polypropylene, polyethylene, polyurethane, nylon, and fibreglass.

6. The air/gas filter medium as claimed in claim 1 wherein said scrim sheet is a rigid sheet formed with an irregular shaped surface on which said homogeneous core is bonded to increase the surface area per square inch of said core layer while maintaining a constant thickness throughout.

7. The air/gas filter medium as claimed in claim 1 wherein said core layer has two or more horizontal air permeable layers with a lowermost one of said air permeable layers having said feather down clusters compressed to a higher density than said down clusters in an uppermost one of said air permeable layer, said uppermost one of said air permeable layer contains air pockets of larger dimension than air pockets in said lowermost one of said two or more horizontal air permeable layers, said two or more horizontal air permeable layers of different air permeability providing increase efficiency and longevity of said air/gas filter medium.

8. The air/gas filter medium as claimed in claim 7 wherein said uppermost one of said air permeable layer is bound to said lowermost one of said air permeable layer by said binder in an upper surface region of said lowermost one of said air permeable layer being in an adhesive state by heat treatment.

9. The air/gas filter medium as claimed in claim 7 wherein said uppermost one of said air permeable layer is bound to said lowermost one of said air permeable layer by one of heat activated glue particles and heat activated synthetic binding fibers.

10. The air/gas filter medium as claimed in claim 7 wherein said uppermost and lowermost one of said air permeable layers are formed of different feather down clusters selected from the group consisting of goose or duck down clusters, a mixture of goose or duck down clusters, and a mixture thereof with synthetic fibers in predetermined proportions.

11. The air/gas filter medium as claimed in claim 1 wherein said binder and said scrim sheet are formed of materials which exhibit stretching to form a multi-directional filter medium capable of flexing and resisting to air pressure forces when held captive across a pressured air flow containing said unwanted substances contained in air or gases.

12. The air/gas filter medium as claimed in claim 1 wherein said air filter medium is in sheet or disc form and supported on a rigid air permeable support held across a restricted passage having an inlet end and an outlet end, said bottom surface of said air filter medium resting on said rigid air permeable support, and an airflow containing said undesirable substances being directed from said inlet end to said outlet end.

13. The air/gas filter medium as claimed in claim 12 wherein there are two or more of said rigid air permeable supports disposed spaced apart along said restricted passage, and an air space between said air filter medium supported on a respective one of said two or more of said rigid air permeable supports.

14. The air/gas filter medium as claimed in claim 13 wherein an impeller fan is secured in said restricted passage at said outlet end creating said airflow through said restricted passage.

15. The air/gas filter medium as claimed in claim 12 wherein said air filter medium is further held captive in a peripheral frame constructed of a material capable of retaining its shape.

16. The air/gas filter medium as claimed in claim 1 wherein said air permeable scrim sheet is a non-woven permeable material layer capable of air passage and obstruction to said down clusters and filaments hereof, said filter medium being adapted for use in the construction of a face mask filter.

* * * * *